US012658103B2

(12) United States Patent
Lee et al.

(10) Patent No.: US 12,658,103 B2
(45) **Date of Patent: *Jun. 16, 2026**

(54) PIXEL CIRCUIT AND DISPLAY DEVICE INCLUDING THE SAME

(71) Applicant: Samsung Display Co., Ltd., Yongin-Si (KR)

(72) Inventors: Sehyun Lee, Yongin-si (KR); Kwihyun Kim, Yongin-si (KR); Yeonkyung Kim, Yongin-si (KR); Jinjoo Ha, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/401,714

(22) Filed: Jan. 2, 2024

(65) Prior Publication Data

US 2024/0290250 A1 Aug. 29, 2024

(30) Foreign Application Priority Data

Feb. 23, 2023 (KR) ........................ 10-2023-0024359

(51) Int. Cl.
*G09G 3/32* (2016.01)

(52) U.S. Cl.
CPC ....... *G09G 3/32* (2013.01); *G09G 2310/0216* (2013.01); *G09G 2310/0267* (2013.01); *G09G 2310/0275* (2013.01); *G09G 2310/0278* (2013.01); *G09G 2310/08* (2013.01); *G09G 2320/0233* (2013.01)

(58) Field of Classification Search
CPC ............. G09G 3/32; G09G 2310/0216; G09G 2310/0267; G09G 2310/0275; G09G 2310/0278; G09G 2310/08; G09G 2320/0233; G09G 3/3233; G09G 3/3291; G09G 2300/0819; G09G 2300/0842; G09G 2300/0852; G09G 2300/0861; G09G 2320/043
See application file for complete search history.

(56) References Cited

U.S. PATENT DOCUMENTS

| | | | | |
|---|---|---|---|---|
| 9,626,904 | B2 | 4/2017 | Kimura et al. | |
| 10,325,557 | B2 * | 6/2019 | Cho | G09G 3/3233 |
| 2017/0352316 | A1 * | 12/2017 | Zhang | G09G 3/3233 |
| 2018/0005576 | A1 * | 1/2018 | Yoon | G09G 3/3233 |
| 2018/0130418 | A1 * | 5/2018 | Zhu | H01L 29/78648 |
| 2020/0258921 | A1 * | 8/2020 | Takahashi | H10D 86/60 |
| 2021/0248961 | A1 * | 8/2021 | Yang | G09G 3/3233 |

FOREIGN PATENT DOCUMENTS

KR 10-2297000 B1 9/2021

* cited by examiner

*Primary Examiner* — Nelson M Rosario
(74) *Attorney, Agent, or Firm* — Innovation Counsel LLP

(57) ABSTRACT

A pixel circuit includes a light emitting element, a first transistor that provides a driving current to the light emitting element, a first capacitor including a first electrode connected to a control electrode of the first transistor and a second electrode connected to a first electrode of the first transistor, a second capacitor including a first electrode directly connected to the control electrode of the first transistor and a second electrode, and a second transistor that provides a data voltage to the control electrode of the first transistor in response to a write gate signal.

18 Claims, 10 Drawing Sheets

PIXEL CIRCUIT AND DISPLAY DEVICE INCLUDING THE SAME

CROSS-REFERENCE TO RELATED APPLICATION

This application claims priority under 35 USC § 119 to Korean Patent Application No. 10-2023-0024359 filed on Feb. 23, 2023, in the Korean Intellectual Property Office (KIPO), the entire disclosure of which is incorporated herein by reference.

BACKGROUND

1. Field

Embodiments of the present disclosure relate to a pixel circuit and a display device including the pixel circuit.

2. Description of the Related Art

In general, a display device may include a display panel, a gate driver, a data driver, and a timing controller. The display panel may include a plurality of gate lines, a plurality of data lines, and a plurality of pixel circuits electrically connected to the gate lines and the data lines. The gate driver may provide gate signals to the gate lines, the data driver may provide data voltages to the data lines, and the timing controller may control the gate driver and the data driver.

Recently, display devices that provide virtual reality (VR) or augmented reality (AR) are emerging. To this end, the display device requires high density pixels which has increased pixels per inch (ppi). In this case, a pitch occupied by the pixel circuit may be narrowed, so that there may be restrictions on the number of transistors constituting the pixel circuit and the number of signals applied to the pixel circuit.

In addition, as the ppi increases, a data range of the data voltage may gradually decrease. In other words, as the ppi increases, luminance accuracy according to a variation in the data voltage may relatively decrease.

SUMMARY

An object of the present disclosure is to provide a pixel circuit for a low area and high ppi.

Another object of the present disclosure is to provide a display device including the pixel circuit.

However, the object of the present disclosure is not limited thereto. Thus, the object of the present disclosure may be extended without departing from the spirit and the scope of the present disclosure.

According to embodiments, a pixel circuit may include a light emitting element, a first transistor configured to provide a driving current to the light emitting element, a first capacitor including a first electrode connected to a control electrode of the first transistor and a second electrode connected to a first electrode of the first transistor, a second capacitor including a first electrode connected to the control electrode of the first transistor and a second electrode, and a second transistor configured to provide a data voltage to the control electrode of the first transistor in response to a write gate signal.

In an embodiment, the second electrode of the second capacitor may be configured to receive a reference voltage.

In an embodiment, the pixel circuit may further include a third transistor configured to provide a first power voltage to the first transistor in response to an emission signal.

In an embodiment, the pixel circuit may further include a fourth transistor configured to provide a bias voltage to a first electrode of the light emitting element in response to an initialization gate signal.

In an embodiment, the emission signal, the write gate signal, and the initialization gate signal may have activation periods in a first period.

In an embodiment, the write gate signal and the initialization gate signal may have the activation periods in a second period following the first period.

In an embodiment, the emission signal and the initialization gate signal may have the activation periods in a third period following the second period.

In an embodiment, the emission signal may have the activation period in a fourth period following the third period.

In an embodiment, the second transistor may be configured to provide the data voltage to the control electrode of the first transistor in the first period and the second period.

In an embodiment, the emission signal, the write gate signal, and the initialization gate signal may have activation periods in a first period. The write gate signal and the initialization gate signal may have the activation periods in a second period following the first period and a third period following the second period. The emission signal and the initialization gate signal may have the activation periods in a fourth period following the third period. The emission signal has the activation period in a fifth period following the fourth period. The second transistor may be configured to provide a reference voltage to the control electrode of the first transistor in the first period and the second period and to provide the data voltage to the control electrode of the first transistor in the third period.

In an embodiment, a back gate electrode of the first transistor may be connected to the first electrode of the first transistor.

In an embodiment, a back gate electrode of the first transistor may be configured to receive a first power voltage.

In an embodiment, a back gate electrode of the second transistor may be configured to receive a first power voltage.

According to embodiments, a display device may include a display panel including a pixel circuit, a data driver configured to apply a data voltage to the pixel circuit, a gate driver configured to apply a write gate signal to the pixel circuit, and a timing controller configured to control the data driver and the gate driver. Here, the pixel circuit may include a light emitting element, a first transistor configured to provide a driving current to the light emitting element, a first capacitor including a first electrode connected to a control electrode of the first transistor and a second electrode connected to a first electrode of the first transistor, a second capacitor including a first electrode connected to the control electrode of the first transistor and a second electrode, and a second transistor configured to provide the data voltage to the control electrode of the first transistor in response to the write gate signal.

In an embodiment, the second electrode of the second capacitor may be configured to receive a reference voltage.

In an embodiment, the display device may further include an emission driver configured to apply an emission signal to the pixel circuit. The pixel circuit may further include a third transistor configured to provide a first power voltage to the first transistor in response to the emission signal.

In an embodiment, the gate driver may be configured to apply an initialization gate signal to the pixel circuit. The pixel circuit may further include a fourth transistor configured to provide a bias voltage to a first electrode of the light emitting element in response to the initialization gate signal.

In an embodiment, the emission signal, the write gate signal, and the initialization gate signal may have activation periods in a first period. The write gate signal and the initialization gate signal may have the activation periods in a second period following the first period. The emission signal and the initialization gate signal may have the activation periods in a third period following the second period. The emission signal may have the activation period in a fourth period following the third period.

In an embodiment, a back gate electrode of the first transistor may be connected to the first electrode of the first transistor.

In an embodiment, a back gate electrode of the first transistor may be configured to receive a first power voltage.

Therefore, a pixel circuit according to embodiments may expand a data range through capacitance distribution of a first capacitor and a second capacitor.

In addition, the pixel circuit may minimize a body effect on a first transistor.

Further, a display device according to embodiments may have an expanded data range and include a pixel circuit including a small number of transistors, so that high density pixels which has increased ppi can be achieved.

However, the effect of the present disclosure is not limited thereto. Thus, the effect of the present disclosure may be extended without departing from the spirit and the scope of the present disclosure.

DETAILED DESCRIPTION OF THE EMBODIMENTS

Hereinafter, embodiments of the present disclosure will be explained in detail with reference to the accompanying drawings.

Figure 1:
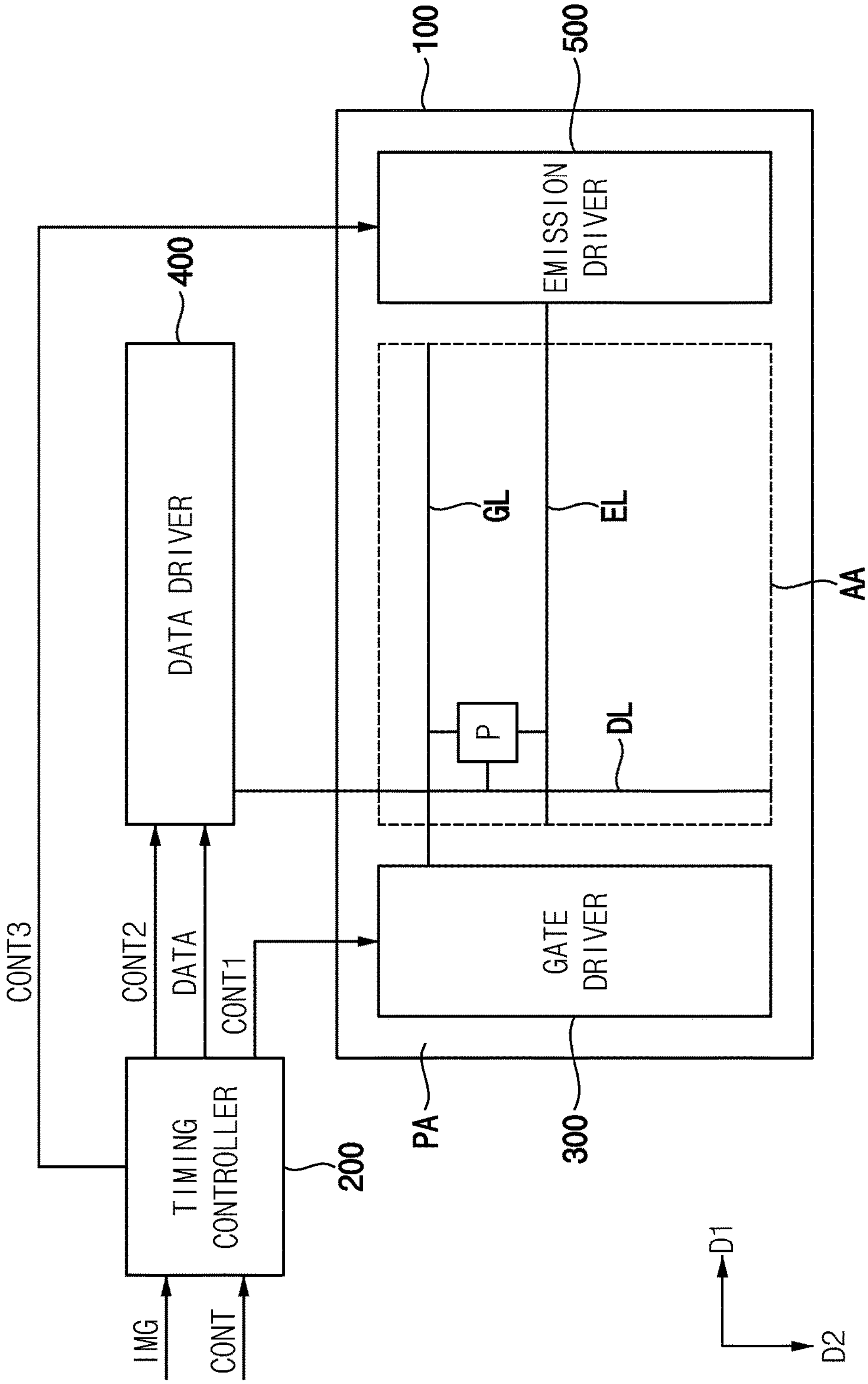
FIG. 1 is a block diagram showing a display device according to embodiments.

FIG. 1 is a block diagram showing a display device according to embodiments.

Referring to FIG. 1, a display device may include a display panel 100, a timing controller 200, a gate driver 300, a data driver 400, and an emission driver 500. According to one embodiment, the timing controller 200 and the data driver 400 may be integrated into one chip.

The display panel 100 may include a display part AA configured to display an image, and a peripheral part PA that is disposed adjacent to the display part AA. According to one embodiment, the gate driver 300 and the emission driver 500 may be mounted on the peripheral part PA.

The display panel 100 may include a plurality of gate lines GL, a plurality of data lines DL, a plurality of emission lines EL, and a plurality of pixel circuits P electrically connected to the gate lines GL, the data lines DL, and the emission lines EL. The gate lines GL and the emission lines EL may extend in a first direction D1, and the data lines DL may extend in a second direction D2 intersecting the first direction D1.

The timing controller 200 may receive input image data IMG and an input control signal CONT from a host processor (e.g., a graphic processing unit (GPU), etc.). For example, the input image data IMG may include red image data, green image data, and blue image data. According to one embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, a third control signal CONT3, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The timing controller 200 may generate the third control signal CONT3 for controlling an operation of the emission driver 500 based on the input control signal CONT to output the generated third control signal CONT3 to the emission driver 500. The third control signal CONT3 may include a vertical start signal and an emission clock signal.

The gate driver 300 may generate gate signals for driving the gate lines GL in response to the first control signal CONT1 received from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

The emission driver 500 may generate emission signals for driving the emission lines EL in response to the third control signal CONT3 received from the timing controller 200. The emission driver 500 may output the emission signals to the emission lines EL. For example, the emission driver 500 may sequentially output the emission signals to the emission lines EL.

Figure 2:
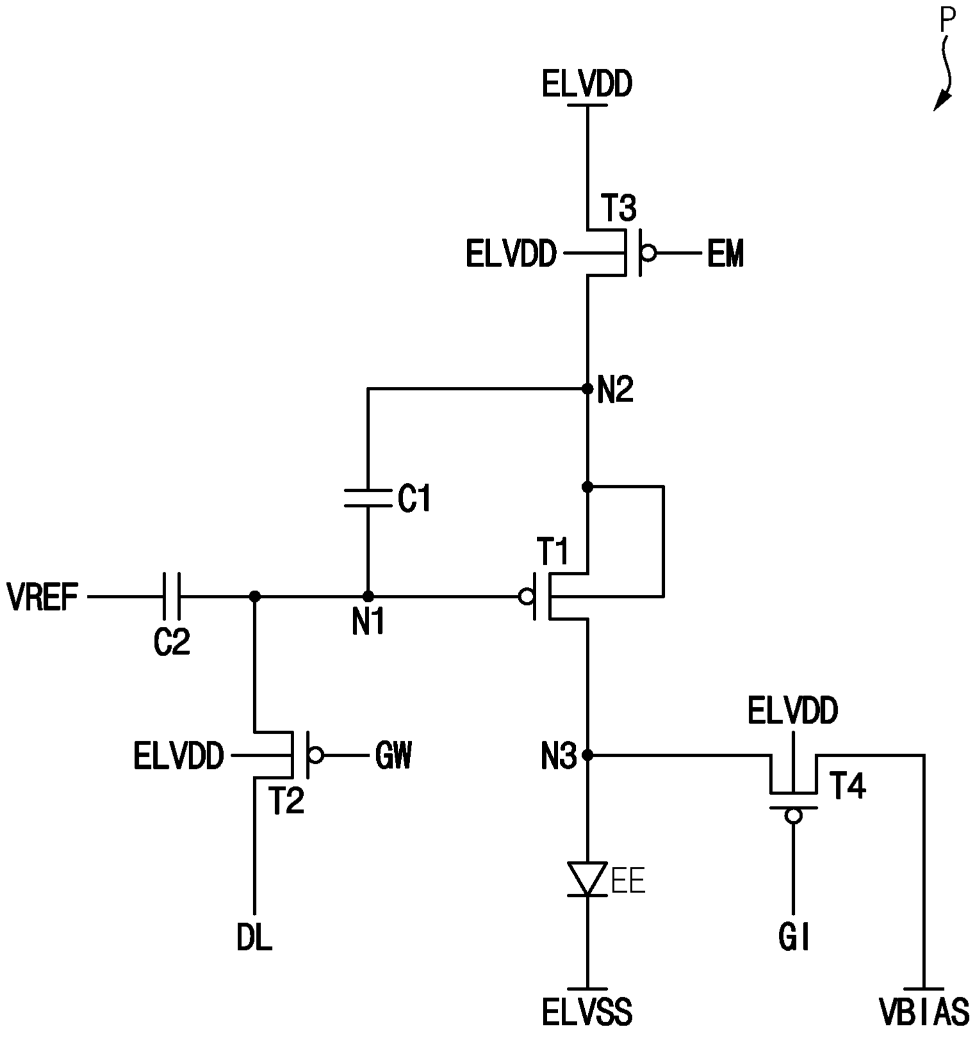
FIG. 2 is a circuit diagram showing one example of a pixel circuit of FIG. 1.

FIG. 2 is a circuit diagram showing one example of a pixel circuit P of FIG. 1.

Referring to FIG. 2, a pixel circuit P may include: a light emitting element EE; a first transistor T1 configured to provide a driving current to the light emitting element EE; a first capacitor C1 including a first electrode connected to a control electrode of the first transistor T1, and a second electrode connected to a first electrode of the first transistor T1; a second capacitor C2 connected between the control electrode of the first transistor T1 and a reference voltage line supplying a reference voltage VREF; and a second transistor T2 configured to provide a data voltage to the control electrode of the first transistor T1 in response to a write gate signal GW. The pixel circuit P may further include a third transistor T3 configured to provide a first power voltage ELVDD (e.g., a high power voltage) to the first transistor T1 in response to an emission signal EM. The pixel circuit P may further include a fourth transistor T4 configured to provide a bias voltage VBIAS to a first electrode (i.e., an anode electrode) of the light emitting element EE in response to an initialization gate signal GI. According to one embodiment, the second electrode of the second capacitor C2 may receive a reference voltage VREF.

For example, the first transistor T1 may include a control electrode connected to a first node N1, a first electrode connected to a second node N2, and a second electrode connected to a third node N3. The second transistor T2 may include a control electrode configured to receive the write gate signal GW, a first electrode connected to the data line DL, and a second electrode connected to the first node N1. The third transistor T3 may include a control electrode configured to receive the emission signal EM, a first electrode configured to receive the first power voltage ELVDD, and a second electrode connected to the second node N2. The fourth transistor T4 may include a control electrode configured to receive the initialization gate signal GI, a first electrode configured to receive the bias voltage VBIAS, and a second electrode connected to the third node N3. The first capacitor C1 may include a first electrode connected to the first node N1, and a second electrode connected to the second node N2. The second capacitor C2 may include a first electrode connected to the first node N1, and a second electrode configured to receive the reference voltage VREF. The light emitting element EE may include a first electrode connected to the third node N3, and a second electrode configured to receive a second power voltage ELVSS (e.g., a low power voltage).

The first to fourth transistors T1, T2, T3, and T4 may be implemented as p-channel metal oxide semiconductor (PMOS) transistors. In this case, a low voltage level may be an activation level, and a high voltage level may be an inactivation level. For example, when a signal applied to a control electrode of the PMOS transistor has the low voltage level, the PMOS transistor may be turned on. For example, when the signal applied to the control electrode of the PMOS transistor has the high voltage level, the PMOS transistor may be turned off.

However, the present disclosure is not limited thereto. For example, the first to fourth transistors T1, T2, T3, and T4 may be implemented as n-channel metal oxide semiconductor (NMOS) transistors. In this case, a low voltage level may be an inactivation level, and a high voltage level may be an activation level. For example, when a signal applied to a control electrode of the NMOS transistor has the low voltage level, the NMOS transistor may be turned off. For example, when the signal applied to the control electrode of the NMOS transistor has the high voltage level, the NMOS transistor may be turned on. In addition, the activation level and the inactivation level may be determined depending on a type of the transistor.

According to one embodiment, a back gate electrode of the first transistor T1 may be connected to the first electrode of the first transistor T1. Accordingly, a voltage difference between the back gate electrode and the first electrode of the first transistor T1 may become 0, so that a body effect on the first transistor T1 may be minimized.

According to one embodiment, a back gate electrode of the second transistor T2 may receive the first power voltage ELVDD. A back gate electrode of the third transistor T3 may receive the first power voltage ELVDD. A back gate electrode of the fourth transistor T4 may receive the first power voltage ELVDD.

Figure 3:
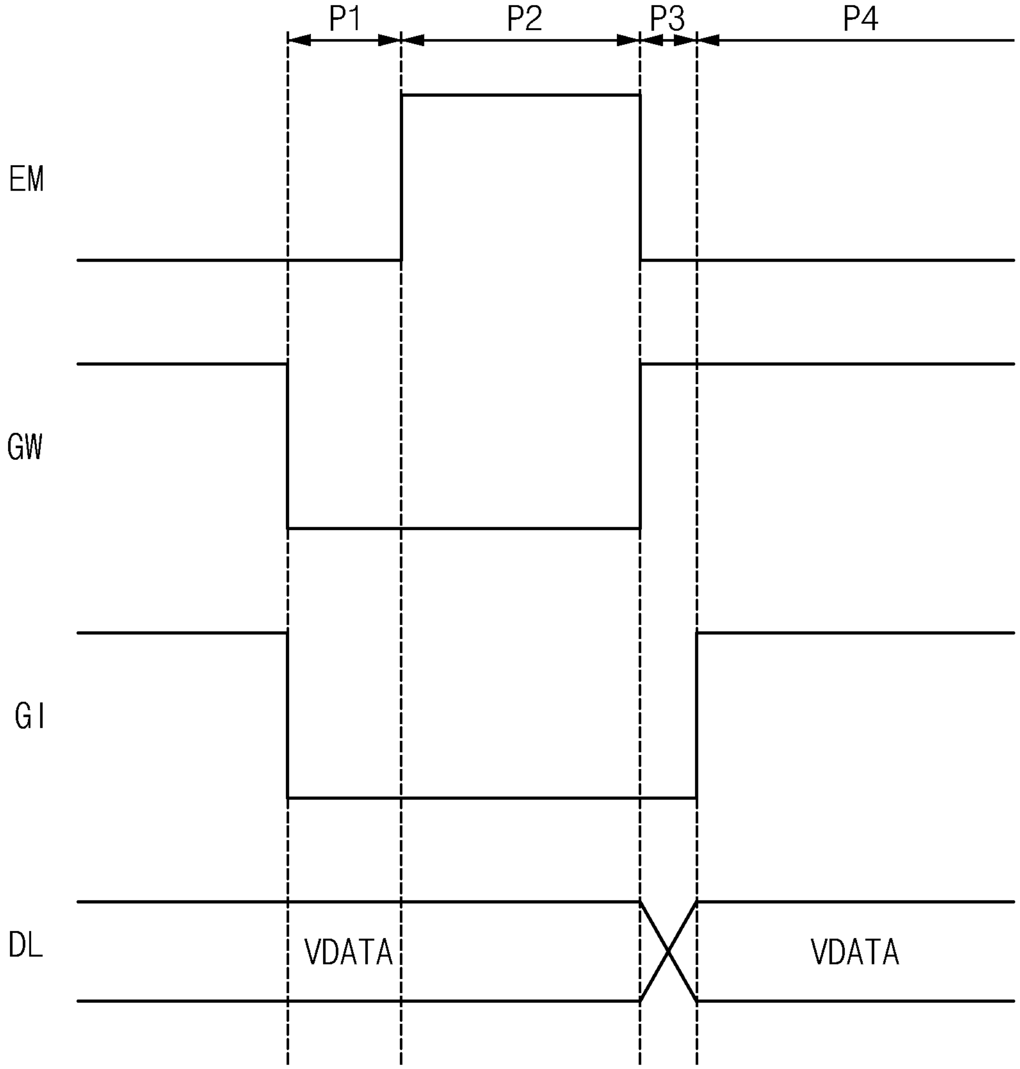
FIG. 3 is a timing diagram showing one example of driving the pixel circuit of FIG. 2.
Figure 4:
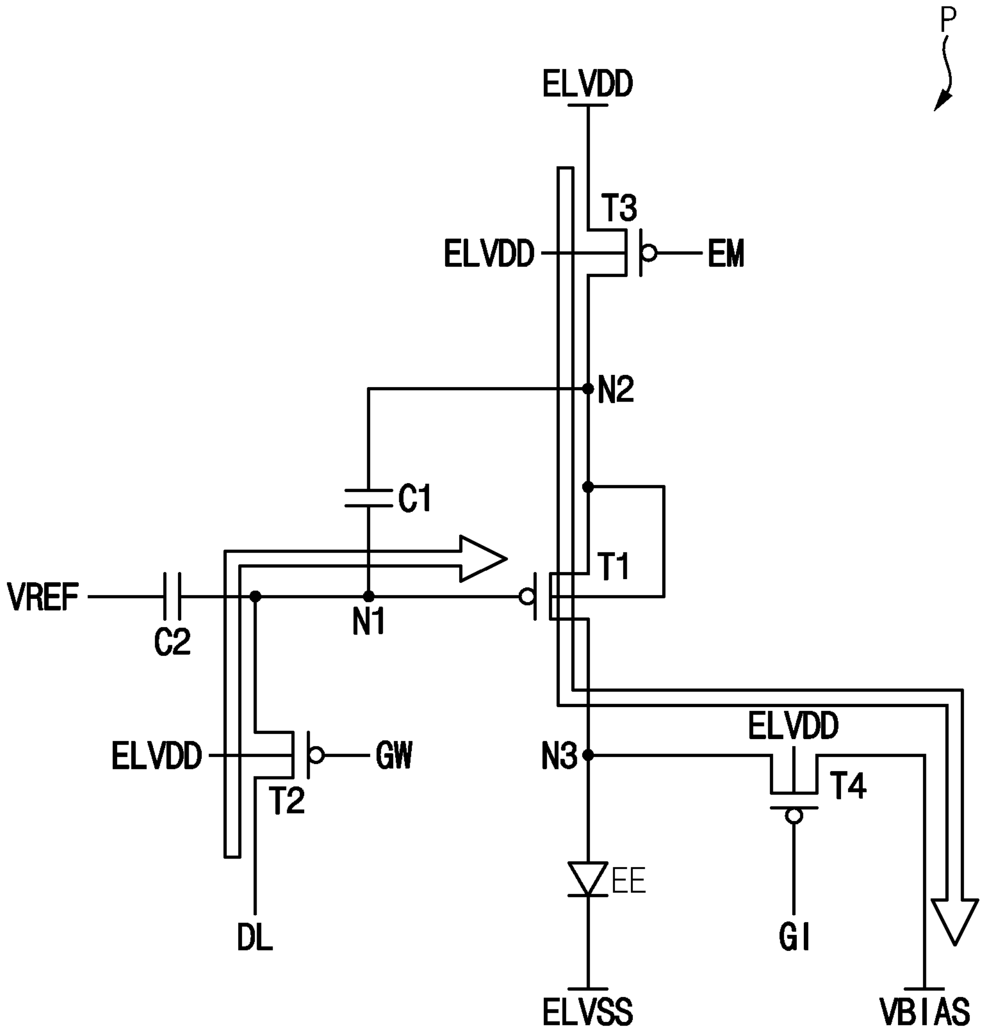
FIG. 4 is a circuit diagram showing one example in which the pixel circuit of FIG. 2 operates in a first period.
Figure 5:
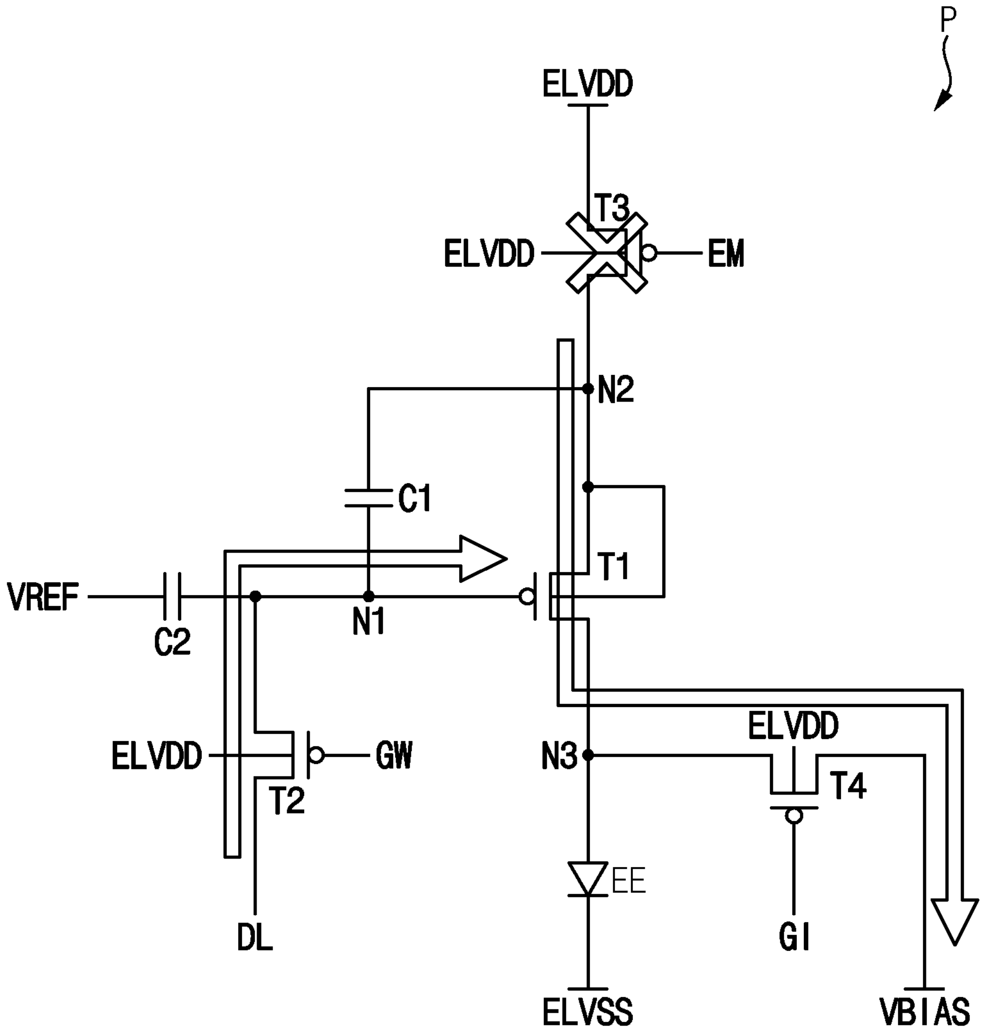
FIG. 5 is a circuit diagram showing one example in which the pixel circuit of FIG. 2 operates in a second period.
Figure 6:
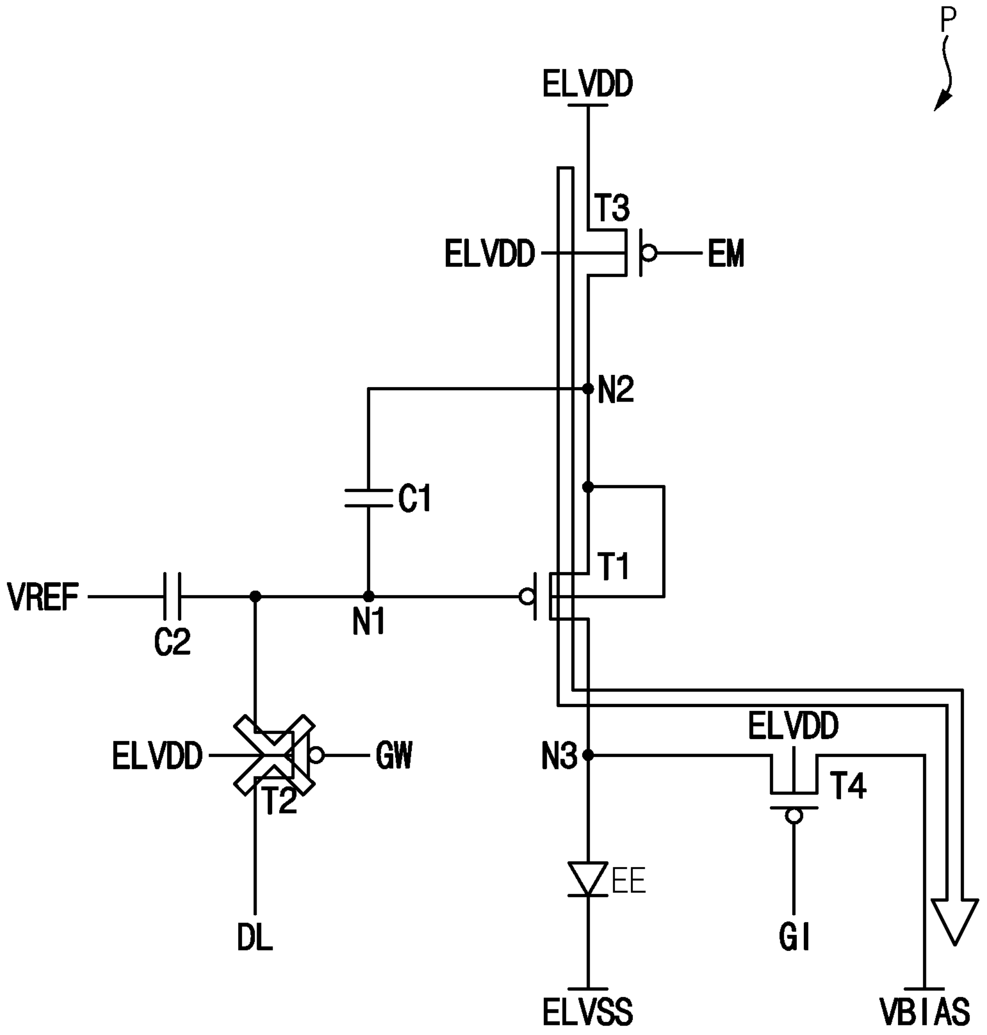
FIG. 6 is a circuit diagram showing one example in which the pixel circuit of FIG. 2 operates in a third period.
Figure 7:
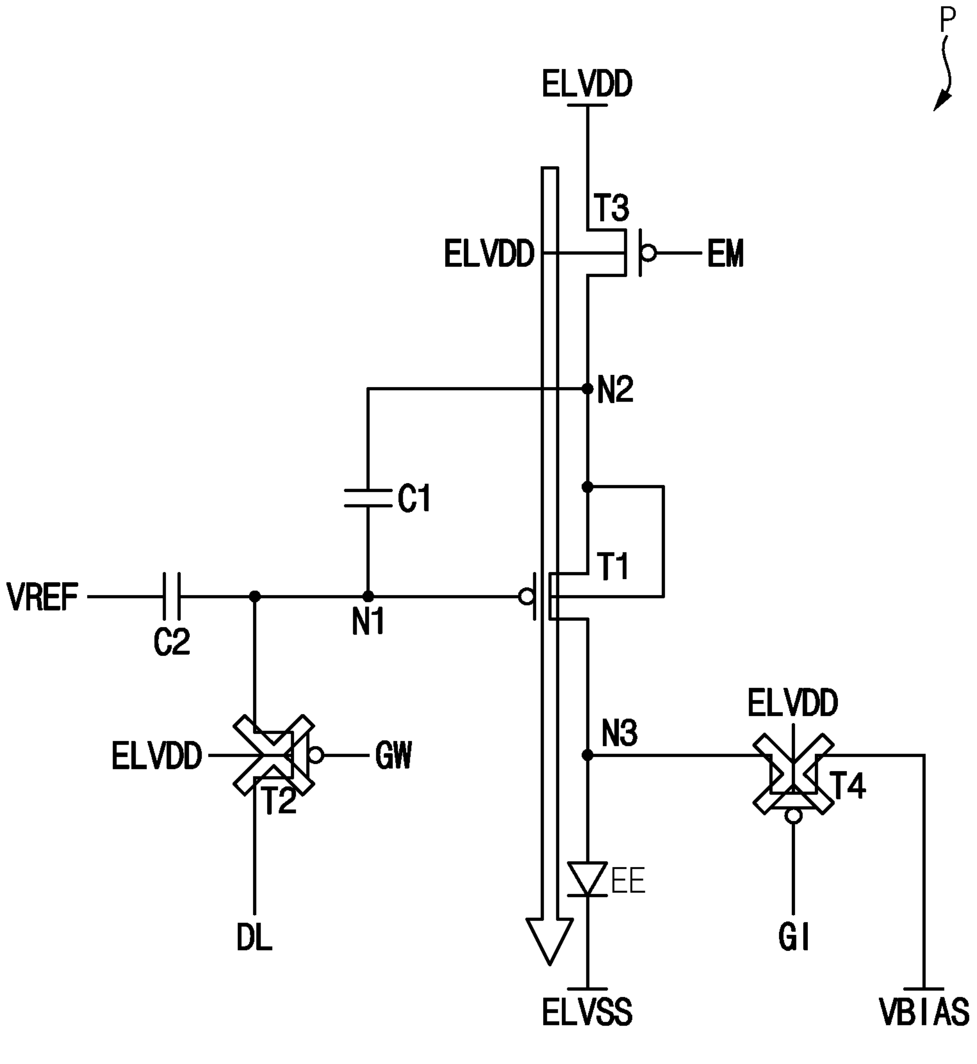
FIG. 7 is a circuit diagram showing one example in which the pixel circuit of FIG. 2 operates in a fourth period.

FIG. 3 is a timing diagram showing one example of driving the pixel circuit P of FIG. 2, FIG. 4 is a circuit diagram showing one example in which the pixel circuit P of FIG. 2 operates in a first period P1, FIG. 5 is a circuit diagram showing one example in which the pixel circuit P of FIG. 2 operates in a second period P2, FIG. 6 is a circuit diagram showing one example in which the pixel circuit P of FIG. 2 operates in a third period P3, and FIG. 7 is a circuit diagram showing one example in which the pixel circuit P of FIG. 2 operates in a fourth period P4.

Referring to FIGS. 3 and 4, in a first period P1, the emission signal EM, the write gate signal GW, and the initialization gate signal GI may have activation periods. In other words, the second transistor T2, the third transistor T3, and the fourth transistor T4 may be turned on. Therefore, the second transistor T2 may provide the data voltage VDATA to the first node N1, so that the data voltage VDATA may be written to the first capacitor C1. In addition, a path passing through the third transistor T3, the first transistor T1, and the fourth transistor T4 may be formed, so that the first electrode of the first transistor T1 and the first electrode of the light emitting element EE may be initialized.

Referring to FIGS. 3 and 5, in a second period P2 following the first period P1, the write gate signal GW and the initialization gate signal GI may have the activation periods, and the emission signal EM may have an inactivation period. In other words, the second transistor T2 and the fourth transistor T4 may be turned on, and the third transistor T3 may be turned off. Therefore, the second transistor T2 may provide the data voltage VDATA to the first node N1, so that a voltage of the first node N1 may be the data voltage VDATA, and a voltage of the second node N2 may be VDATA−VTH. In this case, VDATA may be a data voltage, and VTH may be a threshold voltage of a first transistor T1. In addition, as described above, since the body effect on the first transistor T1 is minimized, threshold voltage compensation capability of the pixel circuit P may be improved.

Referring to FIGS. 3 and 6, in a third period P3 following the second period P2, the emission signal EM and the initialization gate signal GI may have the activation periods, and the write gate signal GW may have an inactivation period. In other words, the third transistor T3 and the fourth transistor T4 may be turned on, and the second transistor T2 may be turned off. Therefore, the first electrode of the light emitting element EE may be initialized to the bias voltage VBIAS, so that emission of a light from the light emitting element EE caused by a leakage current may be minimized in a pixel circuit P that displays black.

Referring to FIGS. 3 and 7, in a fourth period P4 following the third period P3, the emission signal EM may have the activation period, and the write gate signal GW and the initialization gate signal GI may have inactivation periods. In other words, the third transistor T3 may be turned on, and the second transistor T2 and the fourth transistor T4 may be turned off. Therefore, the first power voltage ELVDD may be applied to the first transistor T1 to generate the driving current, and the driving current may be applied to the light emitting element EE. In other words, the light emitting element EE may emit the light with a luminance corresponding to the driving current.

In the fourth period P4, the voltage of the second node N2 may be ELVDD. In addition, the voltage of the first node N1 may be increased by (ELVDD−(VDATA−VTH))*((C_C1)/(C_C1+C_C2)) due to coupling of the first capacitor C1, so that the voltage of the first node N1 may be VDATA+(ELVDD−(VDATA−VTH))*((C_C1)/(C_C1+C_C2)). The driving current may be determined according to a gate-source voltage of the first transistor T1, and the gate-source voltage of the first transistor T1 may be VDATA+(ELVDD−(VDATA−VTH))*((C_C1)/(C_C1+C_C2))−ELVDD. A component of VDATA in the gate-source voltage may be VDATA*(1−((C_C1)/(C_C1+C_C2))), and since 1−((C_C1)/(C_C1+C_C2)) is less than 1, a data range of the data voltage VDATA may be expanded. In this case, ELVDD may be a first power voltage, VDATA may be a data voltage, VTH may be a threshold voltage of a first transistor T1, C_C1 may be a capacitance of a first capacitor, and C_C2 may be a capacitance of a second capacitor.

In this case, the activation period may be a period with an activation level, and the inactivation period may be a period with an inactivation level.

Figure 8:
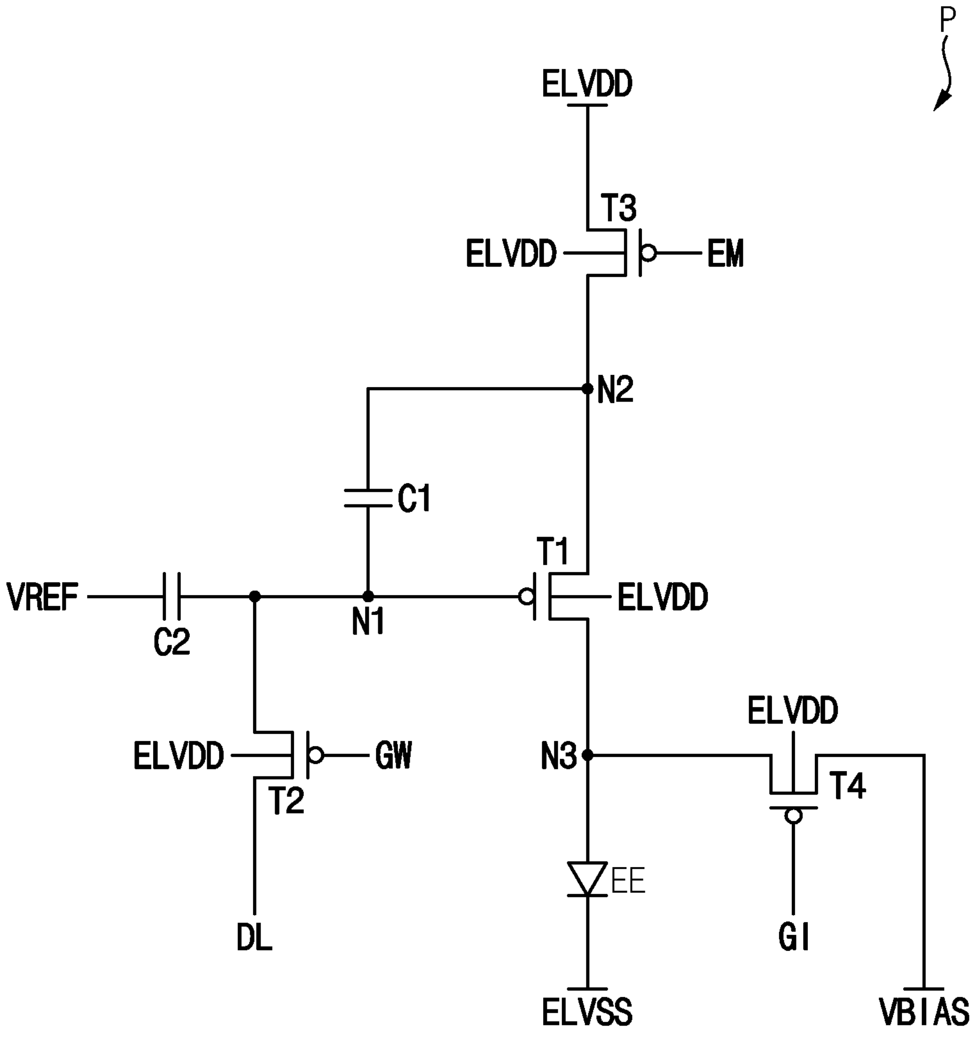
FIG. 8 is a circuit diagram showing a pixel circuit according to embodiments.

FIG. 8 is a circuit diagram showing a pixel circuit P according to embodiments.

Since a pixel circuit P according to the present embodiments has a configuration that is substantially identical to the configuration of the pixel circuit P of FIG. 2 except for the back gate electrode of the first transistor T1, the same reference numbers and reference signs will be used for the same or similar components, and redundant descriptions will be omitted.

Referring to FIG. 8, a back gate electrode of the first transistor T1 may receive the first power voltage ELVDD. Accordingly, while a threshold voltage of the first transistor T1 is compensated (e.g., during the second period P2 of FIG. 3), a voltage difference between the back gate electrode and the first electrode of the first transistor T1 may become 0, so that a body effect on the first transistor T1 may be minimized. Therefore, since the body effect on the first transistor T1 is minimized, threshold voltage compensation capability of the pixel circuit P may be improved.

Figure 9:
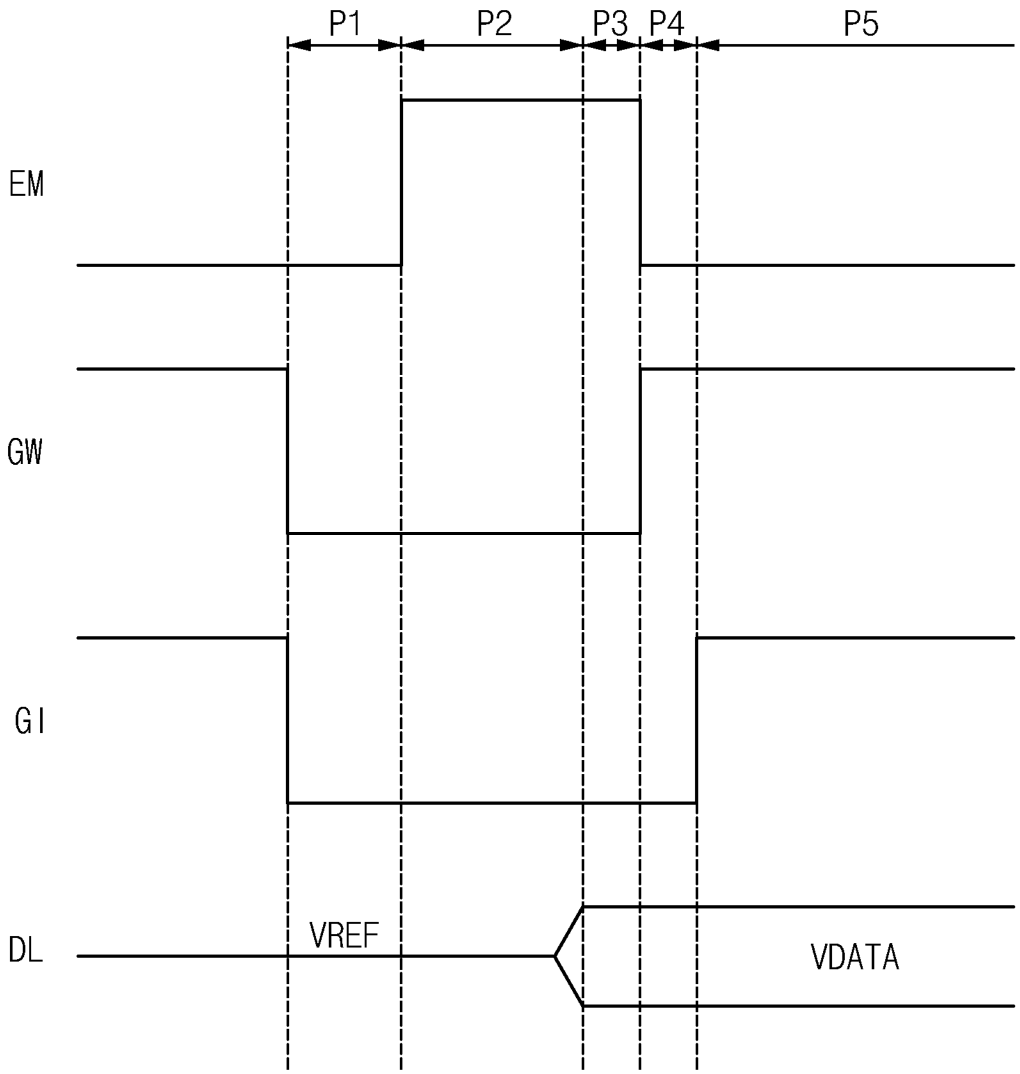
FIG. 9 is a timing diagram showing one example of driving a pixel circuit according to embodiments.

FIG. 9 is a timing diagram showing one example of driving a pixel circuit P according to embodiments.

Since driving of a pixel circuit P according to the present embodiments is substantially identical to the driving of the pixel circuit P of FIG. 3 except for a voltage applied to the data line DL, the same reference numbers and reference signs will be used for the same or similar components, and redundant descriptions will be omitted.

Referring to FIGS. 8 and 9, the second transistor T2 may provide the reference voltage VREF to the control electrode of the first transistor T1 in a first period P1 and a second period P2, and may provide the data voltage VDATA to the control electrode of the first transistor T1 in a third period P3.

In the first period P1, the emission signal EM, the write gate signal GW, and the initialization gate signal GI may have activation periods. In other words, the second transistor T2, the third transistor T3, and the fourth transistor T4 may be turned on. Therefore, the second transistor T2 may provide the reference voltage VREF to the first node N1. In addition, a path passing through the third transistor T3, the first transistor T1, and the fourth transistor T4 may be formed, so that the first electrode of the first transistor T1 and the first electrode of the light emitting element EE may be initialized.

In the second period P2 following the first period P1, the write gate signal GW and the initialization gate signal GI may have the activation periods, and the emission signal EM may have an inactivation period. In other words, the second transistor T2 and the fourth transistor T4 may be turned on, and the third transistor T3 may be turned off. Therefore, the second transistor T2 may provide the reference voltage VREF to the first node N1, so that a voltage of the first node N1 may be the reference voltage VREF, and a voltage of the second node N2 may be VREF−VTH. In this case, VREF may be a reference voltage, and VTH may be a threshold voltage of a first transistor T1.

According to one embodiment, the reference voltage VREF may be equal to a data voltage VDATA for a low gray level. According to one embodiment, the reference voltage VREF may be equal to a data voltage VDATA for a lowest gray level.

For example, the current generated by the first transistor T1 may be smaller in a case where the reference voltage VREF is applied to the first node N1 than in a case where the data voltage VDATA is applied to the first node N1.

Therefore, since the reference voltage VREF is applied to the first node N1 in the first period P1 and the second period P2, fluctuation of the first power voltage ELVDD caused by the current may be minimized.

In the third period P3 following the second period P2, the write gate signal GW and the initialization gate signal GI may have the activation periods, and the emission signal EM may have the inactivation period. In other words, the second transistor T2 and the fourth transistor T4 may be turned on, and the third transistor T3 may be turned off. Therefore, the second transistor T2 may provide the data voltage VDATA to the first node N1, so that the voltage of the first node N1 may be the data voltage VDATA, and the voltage of the second node N2 may be VDATA−VTH. In this case, VDATA may be a data voltage, and VTH may be a threshold voltage of a first transistor T1. In addition, as described above, since the body effect on the first transistor T1 is minimized, threshold voltage compensation capability of the pixel circuit P may be improved.

In a fourth period P4 following the third period P3, the emission signal EM and the initialization gate signal GI may have the activation periods, and the write gate signal GW may have an inactivation period. In other words, the third transistor T3 and the fourth transistor T4 may be turned on, and the second transistor T2 may be turned off. Therefore, the first electrode of the light emitting element EE may be initialized to the bias voltage VBIAS, so that emission of a light from the light emitting element EE caused by a leakage current may be minimized in a pixel circuit P that displays black.

In a fifth period P5 following the fourth period P4, the emission signal EM may have the activation period, and the write gate signal GW and the initialization gate signal GI may have inactivation periods. In other words, the third transistor T3 may be turned on, and the second transistor T2 and the fourth transistor T4 may be turned off. Therefore, the first power voltage ELVDD may be applied to the first transistor T1 to generate the driving current, and the driving current may be applied to the light emitting element EE. In other words, the light emitting element EE may emit the light with a luminance corresponding to the driving current.

In this case, the activation period may be a period with an activation level, and the inactivation period may be a period with an inactivation level.

Figure 10:
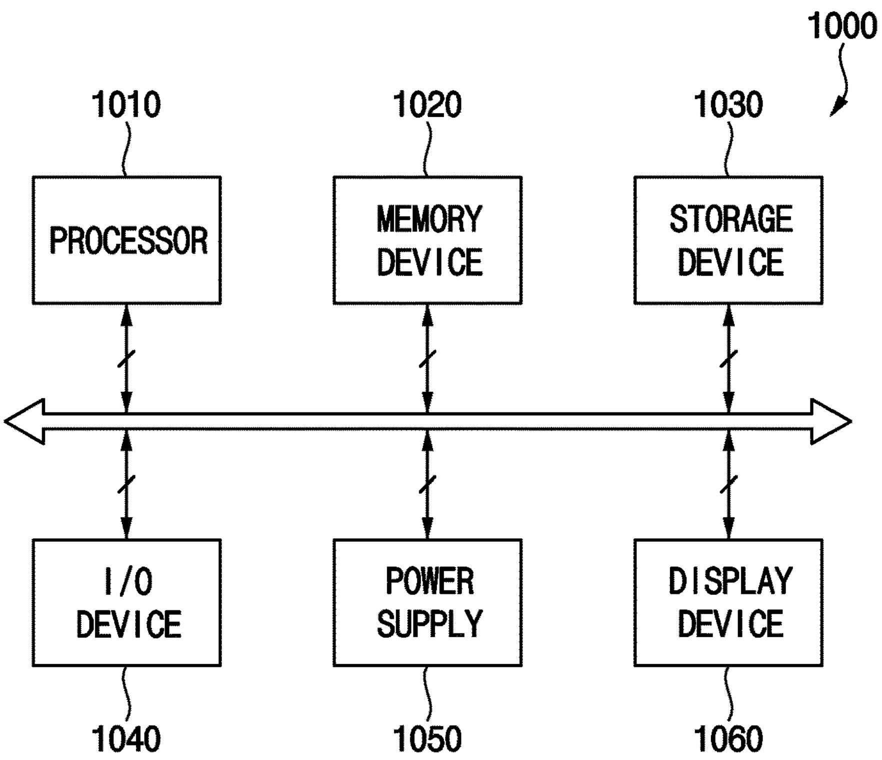
FIG. 10 is a block diagram showing an electronic device according to embodiments.
Figure 11:
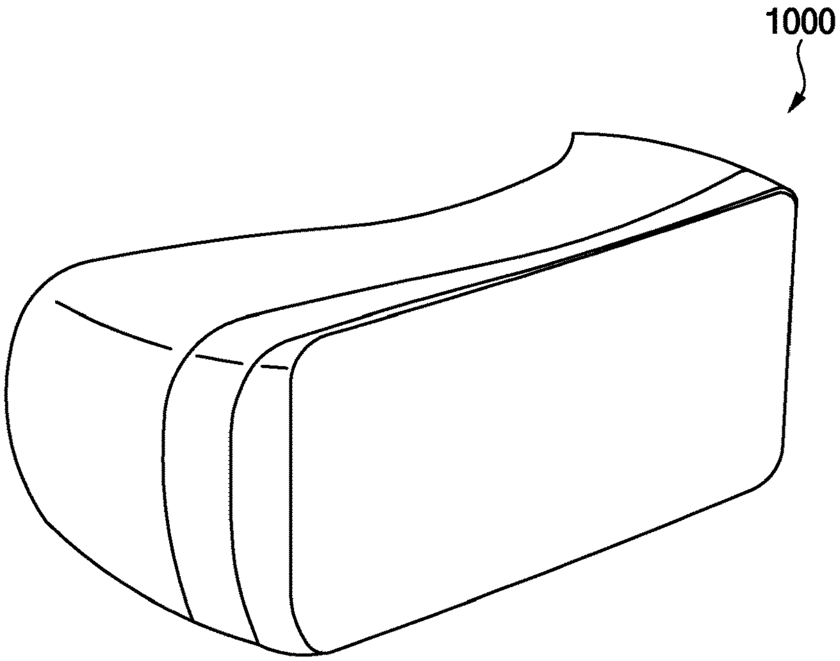
FIG. 11 is a diagram showing one example in which the electronic device of FIG. 10 is implemented as a virtual reality (VR) device.

FIG. 10 is a block diagram showing an electronic device 1000 according to embodiments, and FIG. 11 is a diagram showing one example in which the electronic device 1000 of FIG. 10 is implemented as a virtual reality (VR) device.

Referring to FIGS. 10 and 11, the electronic device 1000 may include a processor 1010, a memory device 1020, a storage device 1030, an input/output (I/O) device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus (USB) device, other electronic devices, etc. In an embodiment, as shown in FIG. 11, the electronic device 1000 may be implemented as the VR device. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch-pad, a touch-screen, etc, and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. In some embodiments, the display device 1060 may be an organic light emitting display device or a quantum dot light emitting display device, but is not limited thereto. The display device 1060 may be connected to other components through the buses or other communication links.

The present disclosure may be applied to a display device and an electronic device including the display device. For example, the present disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A pixel circuit comprising:

a light emitting element;

a first transistor configured to provide a driving current to the light emitting element;

a first capacitor including a first electrode connected to a control electrode of the first transistor and a second electrode connected to a first electrode of the first transistor;

a second capacitor including a first electrode directly connected to the control electrode of the first transistor and a second electrode configured to receive a reference voltage directly from a reference voltage line; and a second transistor configured to provide a data voltage to the control electrode of the first transistor in response to a write gate signal.

2. The pixel circuit of claim 1, further comprising a third transistor configured to provide a first power voltage to the first transistor in response to an emission signal.

3. The pixel circuit of claim 2, further comprising a fourth transistor configured to provide a bias voltage to a first electrode of the light emitting element in response to an initialization gate signal.

4. The pixel circuit of claim 3, wherein the emission signal, the write gate signal, and the initialization gate signal have activation periods in a first period.

5. The pixel circuit of claim 4, wherein the write gate signal and the initialization gate signal have the activation periods in a second period following the first period.

6. The pixel circuit of claim 5, wherein the emission signal and the initialization gate signal have the activation periods in a third period following the second period.

7. The pixel circuit of claim 6, wherein the emission signal has the activation period in a fourth period following the third period.

8. The pixel circuit of claim 7, wherein the second transistor is configured to provide the data voltage to the control electrode of the first transistor in the first period and the second period.

9. The pixel circuit of claim 3, wherein the emission signal, the write gate signal, and the initialization gate signal have activation periods in a first period, wherein the write gate signal and the initialization gate signal have the activation periods in a second period following the first period and a third period following the second period, wherein the emission signal and the initialization gate signal have the activation periods in a fourth period following the third period, wherein the emission signal has the activation period in a fifth period following the fourth period, and wherein the second transistor is configured to provide the reference voltage to the control electrode of the first transistor in the first period and the second period and to provide the data voltage to the control electrode of the first transistor in the third period.

10. The pixel circuit of claim 1, wherein a back gate electrode of the first transistor is connected to the first electrode of the first transistor.

11. The pixel circuit of claim 1, wherein a back gate electrode of the first transistor is configured to receive a first power voltage.

12. The pixel circuit of claim 1, wherein a back gate electrode of the second transistor is configured to receive a first power voltage.

13. A display device comprising:

a display panel including a pixel circuit;

a data driver configured to apply a data voltage to the pixel circuit;

a gate driver configured to apply a write gate signal to the pixel circuit; and a timing controller configured to control the data driver and the gate driver, wherein the pixel circuit includes:

a light emitting element;

a first transistor configured to provide a driving current to the light emitting element;

a first capacitor including a first electrode connected to a control electrode of the first transistor and a second electrode connected to a first electrode of the first transistor;

a second capacitor including a first electrode directly connected to the control electrode of the first transistor and a second electrode configured to receive a reference voltage directly from a reference voltage line; and a second transistor configured to provide the data voltage to the control electrode of the first transistor in response to the write gate signal.

14. The display device of claim 13, further comprising an emission driver configured to apply an emission signal to the pixel circuit, wherein the pixel circuit further includes a third transistor configured to provide a first power voltage to the first transistor in response to the emission signal.

15. The display device of claim 14, wherein the gate driver is configured to apply an initialization gate signal to the pixel circuit, and wherein the pixel circuit further includes:

a fourth transistor configured to provide a bias voltage to a first electrode of the light emitting element in response to the initialization gate signal.

16. The display device of claim 15, wherein the emission signal, the write gate signal, and the initialization gate signal have activation periods in a first period, wherein the write gate signal and the initialization gate signal have the activation periods in a second period following the first period, wherein the emission signal and the initialization gate signal have the activation periods in a third period following the second period, and wherein the emission signal has the activation period in a fourth period following the third period.

17. The display device of claim 13, wherein a back gate electrode of the first transistor is connected to the first electrode of the first transistor.

18. The display device of claim 13, wherein a back gate electrode of the first transistor is configured to receive a first power voltage.

* * * * *